United States Patent [19]

Joray et al.

[11] 4,085,570
[45] Apr. 25, 1978

[54] FORAGE HARVESTER AND ATTACHMENT THEREFOR

[75] Inventors: Marvin L. Joray, Celina; Warner M. Heckley, Rockford; Lyman J. Gunyou, Celina, all of Ohio

[73] Assignee: Avco Corporation, Coldwater, Ohio

[21] Appl. No.: 675,184

[22] Filed: Apr. 8, 1976

[51] Int. Cl.² .......................................... A01D 45/00
[52] U.S. Cl. ............................... 56/2; 56/12.7; 56/13.9
[58] Field of Search .............. 56/12.7, 2, 14.5, 14.6, 56/13.9, 13.5–13.8, 504, 505, 192

[56] References Cited

U.S. PATENT DOCUMENTS

| | | | |
|---|---|---|---|
| 2,644,284 | 7/1953 | Oberholtz et al. | 56/14.1 |
| 3,052,946 | 6/1963 | Mathews | 56/14.9 |
| 3,203,160 | 8/1965 | Thomas | 56/12.7 |
| 3,306,015 | 2/1967 | Myers | 56/504 X |
| 3,412,536 | 11/1968 | Drummond | 56/13.5 |
| 3,491,523 | 1/1970 | Bornzin | 56/2 |
| 3,916,605 | 11/1975 | Richards et al. | 56/13.3 |

FOREIGN PATENT DOCUMENTS

| | | | |
|---|---|---|---|
| 665,184 | 6/1963 | Canada | 56/12.7 |
| 1,238,127 | 6/1960 | France | 56/12.7 |
| 6,613,425 | 3/1968 | Netherlands | 56/12.7 |

*Primary Examiner*—Russell R. Kinsey
*Attorney, Agent, or Firm*—Charles M. Hogan; Joseph Tassone

[57] ABSTRACT

A forage harvester and attachment therefor are provided wherein such attachment serves the multiple purposes of cutting, conditioning, and selectively moving a crop in two basic directions from a crop transfer zone within the attachment, one of the directions being toward the ground and the other being away from the ground. The attachment comprises a flail device of predetermined width for cutting and conditioning a standing crop in one mode of operation and for picking up a pre-cut ground swath of a crop in another mode and moving that swath to the transfer zone. The attachment has an auger for gathering a crop into the transfer zone immediately after cutting to define a dense swath thereof which has a width less than that of the flail device and approximately equal to the width of the ground swath. The attachment has an additional auger and a door for selectively moving crop from the transfer zone in the above-mentioned two basic directions.

23 Claims, 14 Drawing Figures

FORAGE HARVESTER AND ATTACHMENT THEREFOR

BACKGROUND OF THE INVENTION

Present day farming is a highly developed industry wherein numerous special purpose machines are often employed to perform different functions. In general, many of these machines are self-contained and employ their own power and vehicle units including an engine, power transmission system, hydraulic system, wheels, controls, and an operator's console, in addition to their special purpose attachment. For example, equipment is available for use in cutting, conditioning, and laying a hay crop in ground swaths or windrows to promote drying thereof; and different equipment is available for picking up the dried ground swaths of hay crop and delivering same to a forage chopper. Still other equipment has been proposed for cutting, gathering and delivering corn stover and sorghum stover to a forage chopper.

However, it has been shown that it is economically advantageous to provide a basic type of power and vehicle unit, such as a forage harvester, for example, which is adapted to have articulated therewith a number of attachments each capable of fully harvesting or performing a special harvesting operation on a particular forage crop. As an expansion of this basic concept, it would be advantageous to provide a multi-purpose attachment for a harvester which attachment may be used in harvesting and/or performing a harvesting operation on a plurality of forage crops.

SUMMARY

A feature of this invention is an improved forage harvester for a plurality of forage crops.

Another feature of this invention is a multi-purpose attachment for a forage harvester which may be used in completely harvesting and/or performing a harvesting operation on a plurality of forage crops.

Another feature of this invention is the provision in such attachment for cutting, conditioning and selectively moving a crop in two basic directions, mentioned above.

A further feature of this invention is an attachment of the character mentioned which is particularly adapted for use in harvesting a hay crop.

Still another feature of this invention is an attachment of the character mentioned which is particularly adapted for harvesting stover, such as corn stover and sorghum stover.

Another feature of this invention is the provision of an attachment for a forage harvester together with a forage harvester using same wherein such attachment serves the multiple purpose of cutting, conditioning, and selectively moving a crop from a crop transfer zone thereof in the two basic directions mentioned above. The attachment comprises a flail device of predetermined width for cutting and conditioning a corresponding width of a standing crop in one mode of operation and for picking up a pre-cut ground swath of a crop in another mode and moving the ground swath to a transfer zone. The attachment has means for gathering into the transfer zone a standing crop immediately after cutting to define a dense swath thereof which has a width less than such predetermined width and is approximately equal in width to the ground swath. The attachment has means for selectively moving the crop from the transfer zone in the two basic directions. The attachment also includes an adjustable crop and rock deflector as well as a vent of adjustable vent area for discharging air introduced into the attachment by the flail device.

Accordingly, it is an object of this invention to provide a multi-purpose attachment for a forage harvester and a forage harvester using such attachment having one or more of the novel features set forth above or hereinafter shown or described.

Other details, features, objects, uses and advantages of this invention will become apparent from the embodiment thereof presented in the following specification, claims and drawings.

BRIEF DESCRIPTION OF THE DRAWINGS

The accompanying drawings show a present preferred embodiment of this invention, in which.

DESCRIPTION OF ILLUSTRATED EMBODIMENT

Figure 1:
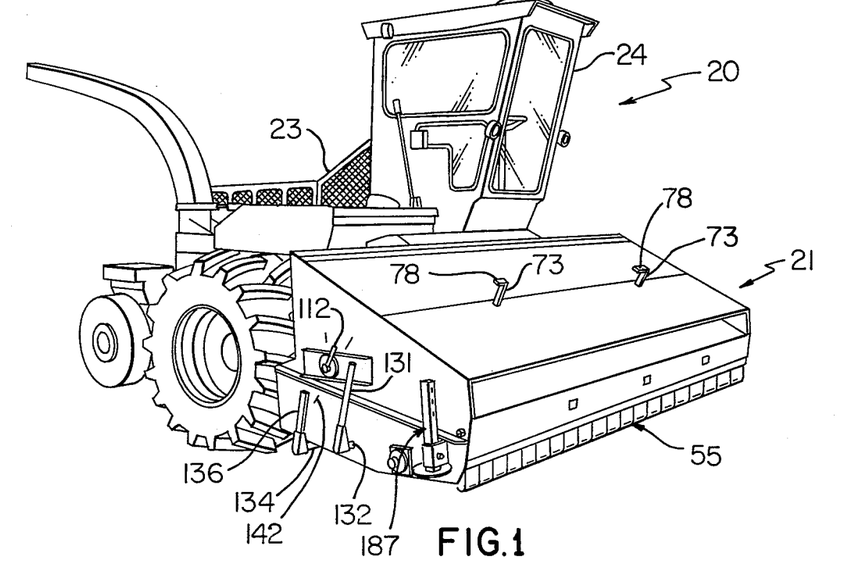
FIG. 1 is a perspective view illustrating an exemplary forage harvester of this invention which employs an attachment or apparatus of this invention.

Reference is now made to FIG. 1 which illustrates an exemplary embodiment of a forage harvester, designated generally by the reference numeral 20, and an attachment 21 used therewith, both in accordance with the invention, the attachment 21 being referred to as a flail header. The illustrated embodiment of attachment 21 and harvester 20 is particularly adapted to serve the multiple purpose of cutting, conditioning and selectively moving a crop in two basic directions from a crop transfer zone (to be defined in detail later) thereof wherein one of the directions is toward the ground, designated by the reference letter G in FIG. 4, and the other of the directions is away from the ground.

Figure 4:
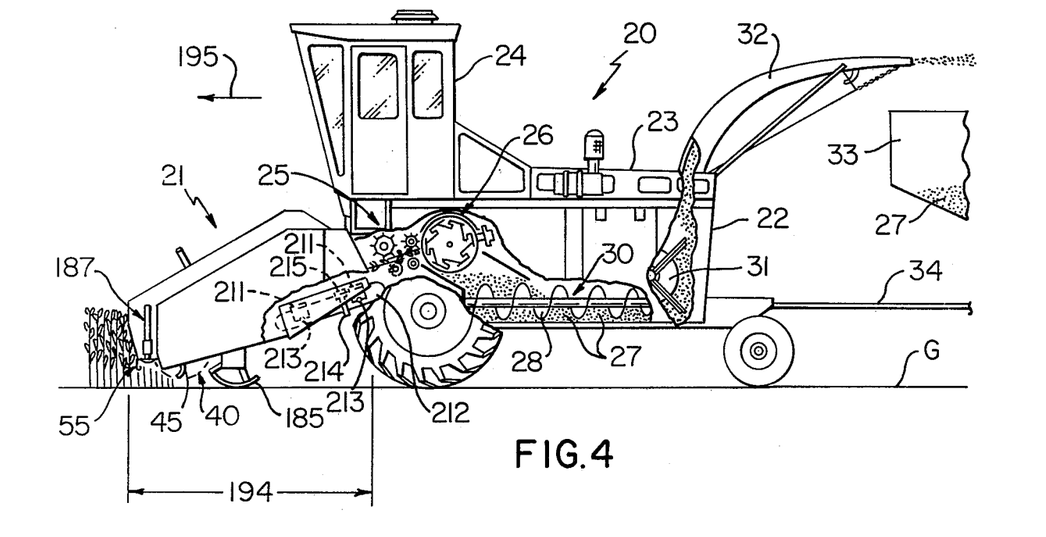
FIG. 4 is a side view of the forage harvester of FIG. 1 with parts broken away, further illustrating the attachment as used to harvest hay.

The forage harvester 20 is particularly adapted to be used in harvesting hay, or corn stover, sorghum stover and other similar plants. In this example of the invention the forage harvester 20 is illustrated in FIG. 4 as utilized in harvesting hay. In order to facilitate exposition the following description refers primarily to the harvesting of hay.

The forage harvester 20 comprises a farm vehicle (FIG. 4) having the usual body 22 housing an engine 23, which may be in the form of a gasoline or diesel engine, for example, and the body 22 is provided with an operator's cab 24. The harvester 20 has conveying means indicated schematically at 25, including suitable wheels, conveyors and the like for conveying crops into the harvester 20 to be chopped for forage.

The harvester 20 has a chopper 26 for chopping the crops or plants introduced into the harvester into pieces 27 which are controlled within a predetermined size range and such size range is varied by a suitable adjustment mechanism (not shown) provided on the chopper 26. The chopped particles 27 are transferred by an auger 28 along a passage 30 on the floor of the harvester 20 and are picked up and propelled by a blower 31 which propels them through a curved chute 32 into a container 33. The container is towed behind the harvester 20 by tow bar 34.

The attachment 21 and the forage harvester 20 serve multiple purposes and are highly versatile in providing various types of forage in farm acreage of all sizes. In particular, the attachment serves the multiple purposes of cutting, conditioning and selectively moving a crop, hay in this example, into a crop transfer zone which is designated generally by the reference numeral 35 in FIGS. 2 and 3 and selectively moving such crop from the crop transfer zone into two basic directions, i.e. toward the ground G or away from the ground. Thus, an operator may make one pass through a field and in one basic operation cut, gather and chop a crop being harvested, or such operator may, after making certain manual settings on the attachment, cut, condition and deposit a crop in well defined windrows or ground swaths. After proper drying thereof the operator may again make the required settings on the attachment 21 and pick up such swaths and immediately chop same in the chopper 26.

Figures 2, 2A:
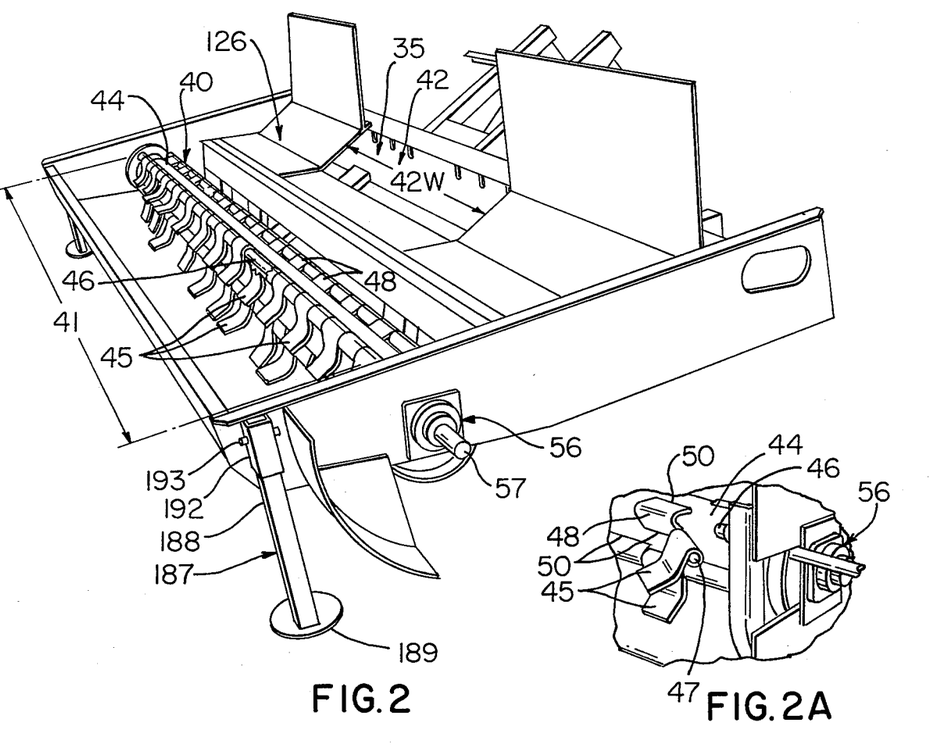
FIG. 2 is a view of the attachment of FIG. 1 only partially assembled to facilitate illustration of a flail device and associated flails or knives, as well as to expose a crop transfer zone thereof.
FIG. 2A is a fragmentary perspective view particularly illustrating the manner of attaching the knives on the flail device.

The flail header or attachment 21 comprises flail means in the form of a flail device or knife subassembly which is designated generally by the reference numeral 40 in FIG. 2. Device 40 is of a predetermined width 41 corresponding to the interior width of the attachment 21 and the predetermined width of the knife subassembly is for the purpose of cutting and conditioning a predetermined width of a standing crop in one mode of operation and for picking up a precut ground swath or windrow of a crop in another mode of operation. In both modes the material is moved into transfer zone 35.

Figure 3:
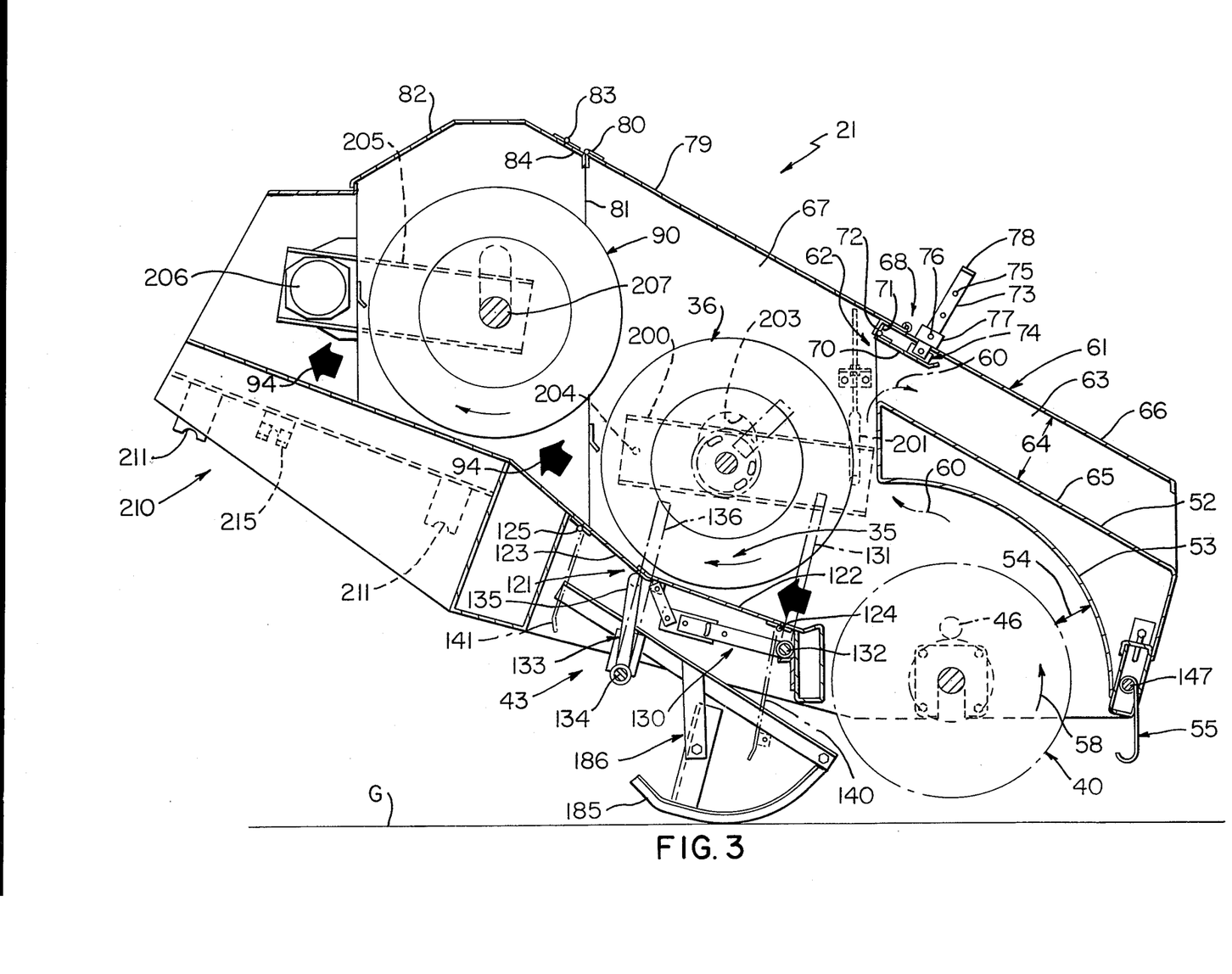
FIG. 3 is a view with parts in cross-section, parts in elevation, and parts broken away, particularly illustrating the relative positions of the flail device and associated crop gathering means and air vent means of the attachment.

The attachment 21 also has gathering means shown as auger 36 for gathering crop into the transfer zone 35 (FIG. 3) immediately after cutting in order to define a dense swath thereof. The auger 36, as shown in FIG. 3 is mounted aft of the flail means. Such dense swath has a width less than the predetermined width 41 and approximately equal to the width of a ground swath as will now be explained. The defined swath of crop is dense because after the flail device 40 cuts a crop being harvested across the entire width 41 auger 36 compresses the crop centrally, compacting the cut crop to a narrower width 42W of the centrally located opening 42 (FIG. 2). The crop is comparatively dense because it is compacted from the width 41 to the width 42W as it approaches and passes through opening 42. In the mode of operation in which the compacted crop is moved toward the ground, the dense swath is substantially equal in width to the ground swath inasmuch as the crop having been compacted to the width 42W is merely allowed to drop by gravity to the ground to define the ground swath. The above-described dense swath may, in another mode of operation, be moved rearwardly away from the ground and through the harvester 20 by utilizing means 43 (FIG. 3) for selectively moving such dense swath, i.e. both augers 36 and 90 in means 43.

The flail device 21 serves to cut and condition a crop such as hay, and the terms "condition" or "conditioning" refer to the process, which is known in the art, of crimping or crushing to the crop in order to assure more rapid drying of the crop.

Knife assemblies for cutting and conditioning hay crops are known to the art. As best shown in FIGS. 2 and 2A, in the attachment 21 the cutting and conditioning are achieved with the knife subassembly 40 which has a rotatable rotor 44 carrying a plurality of flails or knives, a representative few of which are designated by the same reference numeral 45. The knives 45 are secured to the rotor 44 in four rows defined by a plurality of four rods spaced 90 degrees apart. A typical rod 46 is shown in FIG. 2A. Each rod 46 extends through openings 47 in all knives 45 associated therewith. Each rod 46 is secured to the rotor 44 by spaced substantially semi-cylindrical hangers or lugs 48 which are fixed to the rotor, as shown at 50, by welding or the like. Each knife 45 in each row overlaps the knives of alternate rows by roughly ⅛th inch to produce an even and complete cutting action.

The attachment 21 has a housing 52 (FIG. 3) surrounding the upper and front portion of the flail device 40 and the housing 52 includes an inner front wall 53 which provides a throat 54 of controlled clearance between the knives 45 and wall 53. The wall 53 may be adjustable by suitable means (not shown) to control the width of the throat 54.

The attachment 21 has a crop and stone deflector 55 at the forward end thereof which engages and bends forwardly plants which are to be cut to permit the cutting knives 45 to sever such plants in a plane near the base of the stem. The deflector 55 is also used to deflect stones or other hard objects picked up by the knives 45.

The knife subassembly 40 is supported by suitable anti-friction bearings 56 at opposed ends thereof and has a drive shaft 57 extending laterally as shown in FIG. 2. The shaft 57 is employed to provide a high speed rotation of the knife subassembly 40 in the direction of rotation indicated by the arrow 58 (FIG. 3) so as to produce a linear speed at the tip of each knife 45 which may range between 5,000 and 6,000 feet per minute and preferably is of the order of 5,500 feet per minute. A substantial volume of air current, indicated by arrows 60, is generated by the high speed rotation of the knives 45 due to their substantial width and arcuate configuration curving into the direction of rotation.

The rotation of the device 40 with its knives 45 introduces a substantial amount of air 60 within the outer housing 61, as mentioned above, and although such air provides no problem in connection with harvesting of corn stover, sorghum stover and green plants, including hay having a high moisture content (above 40% moisture), it has been found that, in utilizing the attachment 21 to pick up dried windrows of hay or the like, air within the outer housing which is not properly exhausted interferes with the proper transfer of the hay through the crop transfer zone 35 and into the harvester 20.

Figure 6:
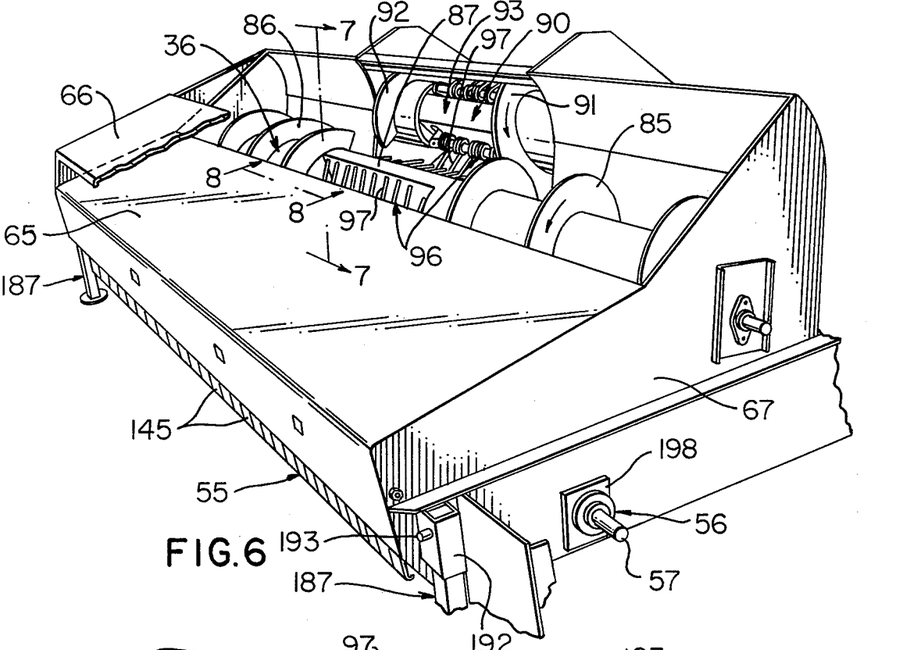
FIG. 6 is a perspective view, with parts broken away, particularly illustrating a long auger which extends throughout the entire interior width of the attachment and a comparatively short auger disposed behind and above the long auger.

To eliminate problems due to the introduction of air, the attachment 21 has air vent means 62 (FIG. 3). The air vent means is in the form of an air exhaust tunnel or duct 63 having a lateral dimension which extends across substantially the entire width 41 and having a height 64. The rectangular air duct 63 conveys the exhaust air in stream 60 so that the flow thereof is forwardly in the direction of movement of the forage harvester 20. With this arrangement any crop accidentally blown through the duct 63 is picked up by the flail device 40. The air duct 63 is defined by a substantially flat intermediate sheet metal wall 65 disposed above the inner front wall 53, a substantially flat outer or top frontal sheet metal wall 66 spaced above and parallel to wall 65 and spaced apart side walls 67 (FIG. 6).

The attachment 21 has means 68 for adjusting the effective flow or vent area of the air duct 63. The vent area adjusting means 68 is comprised of an elongated damper 70 which is hingedly attached by a piano type hinge 71 to a downturned member or flange 72 of the top frontal sheet metal wall 66. The damper 70 has a pair of L-shaped manual operator members 73 each fixed in spaced relation to its swinging end, as shown at 74. Each member 73 has spaced holes 75 adapted to receive a threaded bolt or the like therethrough. The selected holes 75 and bolts register with holes 76 in associated lugs 77 which are fixed to wall 66. The damper 70 is positioned so the desired vent area is produced in the duct 63 by selecting holes 75 in members 73 and aligning them with holes 76 of lugs 77 and securing with a bolt. The adjusting means 68 illustrated in FIG. 3 is positioned so that the duct 63 is fully open. Duct 64 may be partially or substantially fully closed by positioning and securing operators 73 as desired. To facilitate positioning of the damper 73 each member 73 has a substantially L-shaped handle 78 (FIG. 1).

To provide access to the interior of the attachment 21 the outer housing 61 has a sheet metal intermediate top wall 79 which is hingedly attached by a piano-type hinge 80 to a substantially vertically disposed wall 81. The attachment 21 also has an upper substantially outwardly convex rearward top wall 82 also hingedly attached to the wall 81 by a piano-type hinge 83 and flange 84. The hinged sheet metal top wall sections 79 and 82 serve as access doors to the interior of the attachment 21.

The attachment 21 has means for gathering and compressing a crop being harvested and moving same to the crop transfer zone 35 and such means in this example is in the form of an auger 36. The auger 36 has axially inwardly and centrally directing conveying helical gathering formations 85 and 86 (FIG. 6) on opposite end sections thereof which convey the crop inwardly and centrally from the opposite end regions of the auger 36, and hence from opposite sides of the attachment 21 to the crop transfer zone 35, disposed along and beneath the central section 87 of the auger 36. Thus, it is seen that the auger 36 is effective in conveying a crop such as hay, which has been cut and conditioned, in such manner that the hay is gathered in the central portion of flail header 21 and in particular in the transfer zone 35 below the central section 87 of the auger 36 and immediately above the opening 42 (FIG. 2).

As previously mentioned, the attachment 21 has means for selectively moving crop material from the transfer zone 35 in two basic directions, one being toward the ground G and the other being rearwardly away from the ground and toward the chopper 26.

In describing the means for selectively moving the crop material rearwardly from the transfer zone 35 away from the ground reference is made to FIGS. 3 and 6. This means comprises the auger 36 and a second auger 90 disposed rearwardly or aft of and above the first auger 36. The second auger 90 also has helical gathering formations or flights 91 and 92 disposed at opposite end sections thereof and so arranged as to convey crop to the central section 93 below auger 90. The first set of tines 97, 97, 97 on auger 36 is sweeping means selectively active to sweep crop rearwardly through the transfer zone or inactive to permit crop to flow to the ground. The augers 36 and 90 are rotated clockwise (FIG. 3) to convey crop from the crop transfer zone 35 toward the chopper 26 in a path indicated by the large solid arrows 94.

The means or system 43 for selectively moving crop from the transfer zone also includes a first set of fingers or tines on the first auger 36 and a second set of fingers or tines on the second auger 90. Each of such sets is designated by the same reference numeral 96 and all tines of both sets are individually designated by the reference numeral 97. During the mode of operation in which crop is moved rearwardly away from the ground all tines 97 serve as rotary rakes to aid in transferring crop material toward the chopper 26 so that such crop may be picked up and moved by the conveying means 25 (FIG. 4) disposed upstream of the chopper 26. The tines are mounted on the central sections of the augers (FIG. 6).

Figure 7:
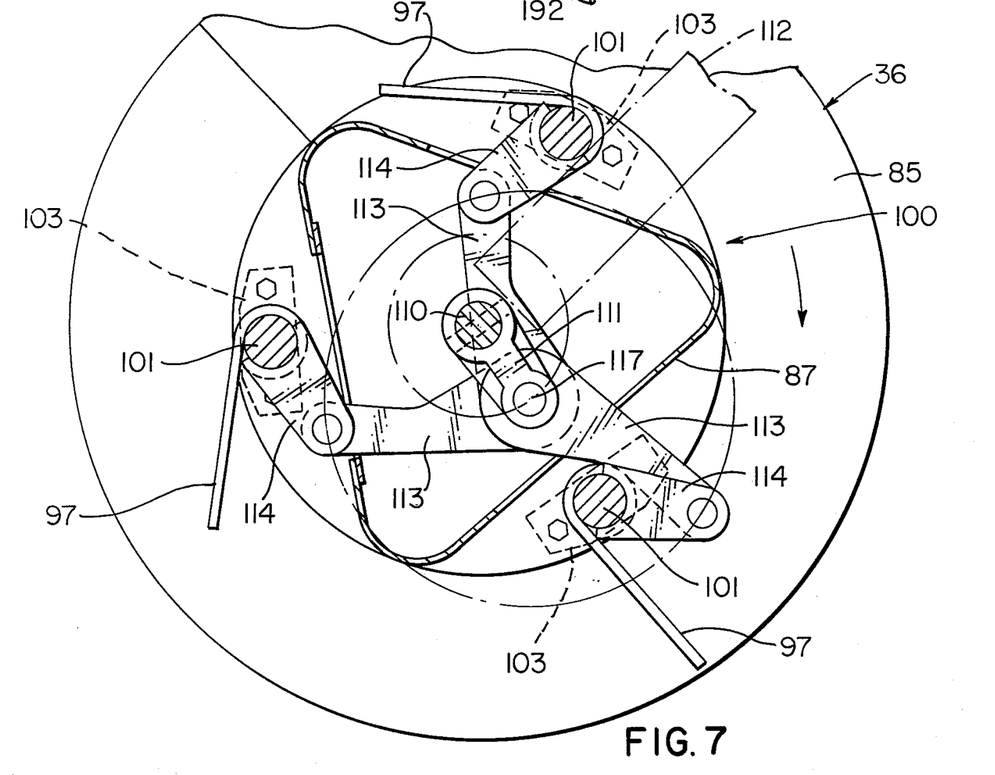
FIG. 7 is a fragmentary view taken on line 7—7 of FIG. 6, with parts in cross-section, parts in elevation and parts broken away and particularly illustrating a set of tines which is typical of the sets on both augers—such tines serving as rotary rakes to help transfer crops—and further illustrating a mechanical operating linkage for folding or extending the tines.
Figure 8:
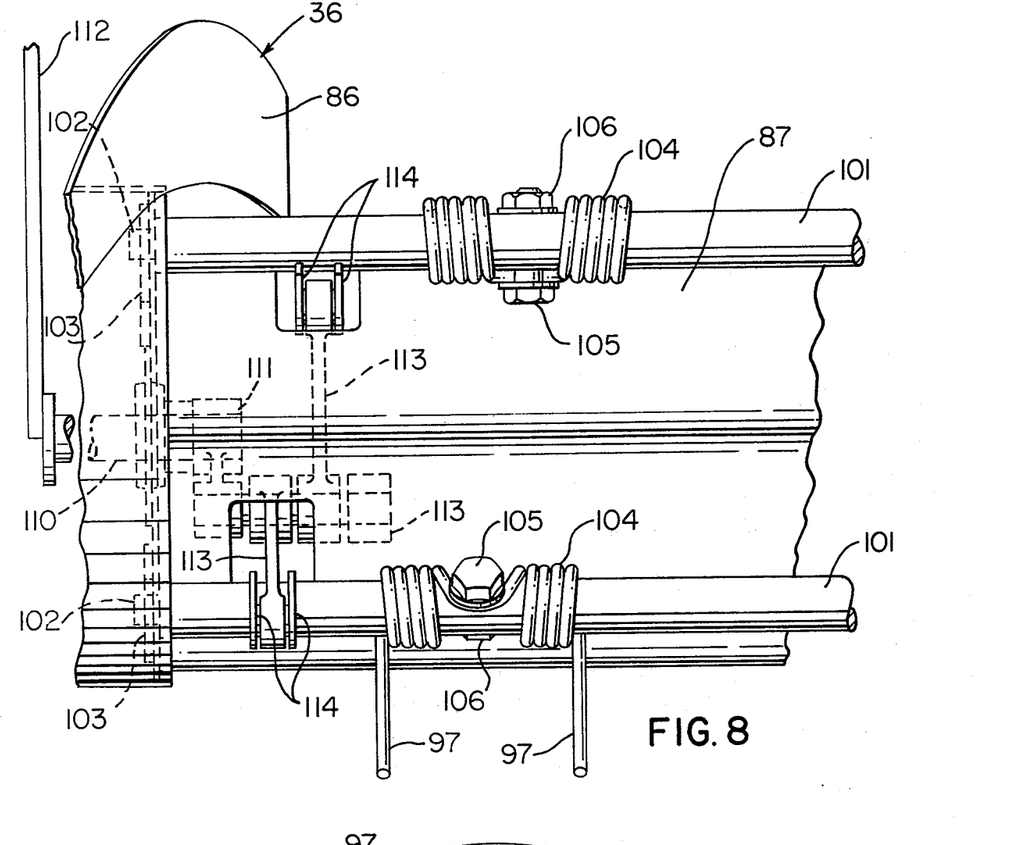
FIG. 8 is a view taken on line 8—8 of FIG. 6 illustrating further details of the mechanical linkage of FIG. 7.
Figure 9:
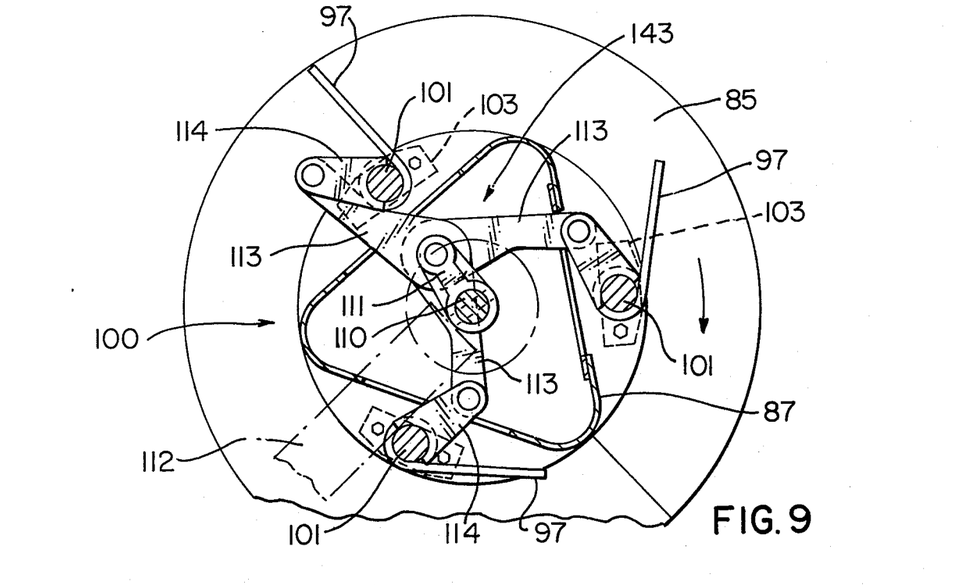
FIG. 9 is a fragmentary view similar to FIG. 7 particularly illustrating the mechanical linkage for the tines so set that the tines are folded against their auger.

Each tine 97 of each set 96 of tines is extended or retracted from its associated auger in a manner now described. Reference is made to FIGS. 7, 8 and 9 for a description of the mechanical actuating linkage for the tines 97 of the auger 36. This exemplary description is basically fully applicable to the similar tine-actuating linkage of the auger 90. In particular, each set 96 has a mechanical linkage 100 provided as a part of the means 43 for selectively moving crop. Each set 96 is comprised of three groups each consisting of a plurality of tines 97 suitably fixed, in this example, on a rod 101.

There are three rods 101 in each linkage. Each rod 101 is rotatable about its separate axis and has reduced end portions 102 carried in journals 103. Each adjoining pair of tines 97 is made of a single springlike wire element 104 which is suitably fastened to its associated rod 101 by a bolt 105 and cooperating nut 106.

Each auger 36 or 90 has a central rod 110 extending from at least one end portion thereof (FIG. 8). Each rod 110 has a mechanical crank arm 111 suitably fixed thereto (FIG. 7). The rod 110 of the long auger 36 only and its crank arm 111 are rotatable from the FIG. 7 position to the FIG. 9 position, for a purpose described below, by a lever 112 suitably fixed to the end of the shaft 110 (FIGS. 7 and 8).

Figure 5:
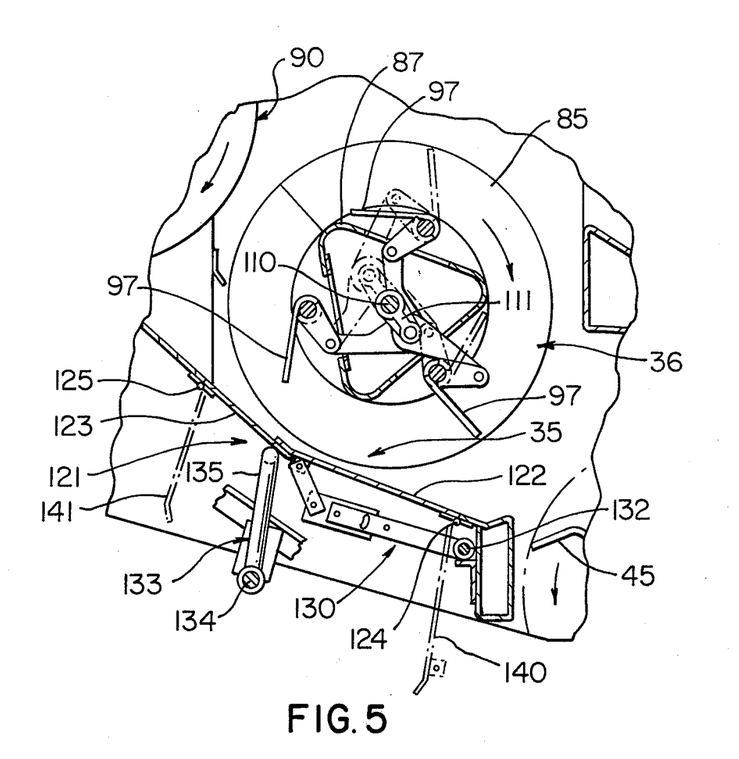
FIG. 5 is a view similar to the central portion of FIG. 3 and particularly illustrating the crop transfer zone near the center of the attachment from which zone crops may be selectively moved in the two basic directions aforesaid.

The linkage 100 also has three connecting rods 113 with each connecting rod having pivotal end connections respectively secured to the radially outer end of the crank arm 111 and the radially inner end of an angular positioning arm 114 for the associated pair of tines 97. The shafts 101 are suitably supported at opposed ends thereof by the journals 103 which are bolted to associated augers. Each twin pair of tines 97, 97 has an arm 114, pivoted on a connecting rod 113. The shaft 110 with the crank arm 111 fixed thereto defines an off-center axis at 117 for exerting thrust against rods 113. During the mode of operation in which crop is directed to conveyor 25 each linkage 100 extends and holds its set 96 of tines 97 substantially perpendicular to its associated auger as the tines descend and sweep through pathway 94 and folds said set of tines against said auger as the tines complete sweep and ascend. Both augers 36 and 90 and both sets 96 of tines 97 are employed to move crop material toward the chopper 26 and such tines serve as efficient rotary rakes (FIG. 5).

The means for selectively moving crops from the transfer zone 35 also comprises door means open during the crop dumping phase of operation, i.e. moving crop toward ground. The door means is designated generally by the reference numeral 121 and is located beneath the central section 87 of the auger 36. Although such door means 121 may be in the form of one or a plurality of doors, in this example of the invention, such door means 121 is shown as a pair of doors 122 and 123, each actuated by a separate opening-closing mechanism and lever. However, it is to be understood that both doors 122 and 123 may be actuated by a single mechanism and lever.

The attachment 21 has a roughly V-shaped sheet metal structure or trough 126 (FIG. 2) across the full width thereof beneath the auger 36. The doors 122 and 123 are hingedly fastened by piano-type hinges 124 and 125 respectively to the trough 126. Trough 126 has its central opening 42 beneath the crop transfer zone 35.

The door 122 is actuated by a linkage assembly 130 which is controlled by a lever 131 fixed to a shaft 132 of the assembly 130. The lever is manually operated and is located at the side of the attachment 21 (FIG. 1). Similarly, the door 123 is actuated by a linkage assembly 133 which includes a shaft 134 having a U-shaped portion 135 suitably fixed thereto and adapted to engage formations on the underside of the door 123 so as to position the door. The U-shaped portion 135 and shaft 134 are rotatable by a manually operated lever 136 (FIG. 1).

With the levers 131 and 136 in the positions illustrated in FIG. 1, the respective linkages 130 and 133 are in the positions shown in FIG. 3 and the doors 122 and 123 are closed. By rotating the levers 131 and 136 counterclockwise, approximately 90° (FIG. 1), the doors 122 and 123 move to dotted line positions (FIG. 3) 140 and 141, respectively.

Having described the manner in which a crop is cut and moved through the attachment 21 and chopper 26 of the harvester 20, the description now proceeds with the cutting, conditioning and placement of a crop, such as hay, on the ground to provide a ground swath or windrow thereof for drying purposes. This is achieved by disconnecting the auger 90 and opening the doors 122 and 123 (FIG. 3) to the dotted line positions 140 and 141 respectively thereof whereby the auger 90 serves as a barrier. It is also necessary to rotate the lever 112 (FIG. 1) approximately 180° so that it is positioned over the mark 142 illustrated in FIG. 1 and this rotates the shaft 110 and the crank 111 fixed thereto to the position illustrated at 143 in FIG. 9 whereby the angular position of crank arm 111 on shaft 110 is displaced 180° (FIG. 7 to FIG. 9). With this displacement the eccentricity of the linkage 100 is effectively moved upwardly and rearwardly so that it folds the tines 97 substantially against the auger 36 as they move into and through the crop transfer zone 35. This movement assures that the tines 97 do not interfere with crops dropping through the opening 42 when the doors 122 and 123 are open to define a ground swath or windrow beneath the opening 42.

Figure 11:
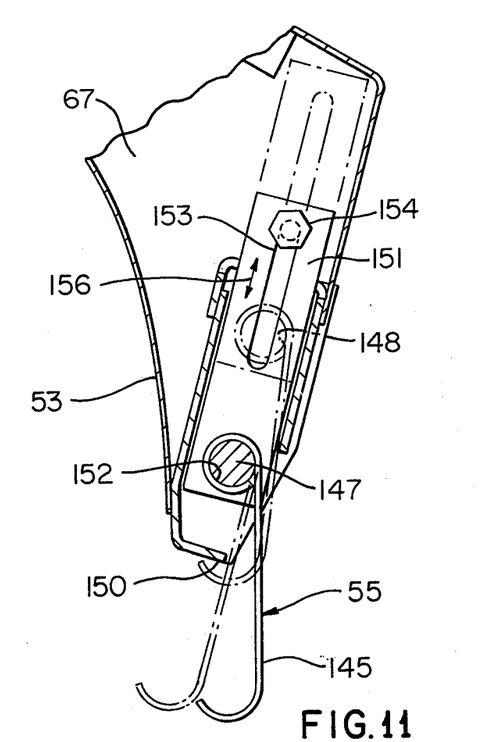
FIG. 11 is a view with parts in cross-section and parts broken away taken on line 11—11 of FIG. 10.

The attachment 21 has a plant and stone deflector 55 (FIG. 11) and such deflector 55 is comprised of a plurality of pendulous members or paddles, a representative few of which are designated by the reference numeral 145. Each paddle 145 is J-shaped in section and has an opening 148 through the upper portion thereof for receiving a supporting rod or pipe 147. The paddles 145 are suspended from the upper ends thereof by the rod 147 so that they are substantially free hanging and can swing in a pendulum-like manner. However, it will be seen that the lower end portions of the paddles are confined or restricted in their movement toward the attachment 21 by a flange 150 in the front wall 53. This restricted movement allows the paddles 145 to serve as crop deflectors bending the individual plants of a crop being harvested toward the ground and away from the attachment 21 so that the knives 45 may sever the plants in the usual manner. The deflector 55 and thus the individual paddles 145 thereof also serve as stone deflectors so that in the event the flails or knives 45 knock a stone forwardly such paddles 145 serve as impact absorbers to prevent damage or injury.

The deflector 55 has means for vertical adjustment thereof, both upwardly and downwardly, and for this purpose the rod 147 is carried on a plurality of five spaced plates 151, two engaging opposite end portions of the rod 147 and three spaced along the rod 147. Each plate 151 has an opening 152 for receiving the rod 147 therethrough and each member 151 has an elongated vertical slot 153 therein which receives an associated nut and bolt assembly 154 therethrough. Each nut and bolt assembly 154 is also received in an associated opening in a side wall 67 of the attachment 21 and in an associated opening in vertical lug members 155 disposed in an accessible manner in front of attachment 21. To move the deflector 55, the assemblies 154 are loosened and the members 151 moved as indicated by the double arrow 156 (FIG. 11), the slots 153 allowing free movement. Once the deflector is at the desired position the assemblies 154 are tightened.

The deflector 55 and hence the bottoms of the individual paddles 145 thereof may be adjusted within any desired range, in practice usually between approximately 3 to 5 inches above ground level. Thus, for a hay crop 2 to 3 feet tall and yielding roughly three tons per acre the bottoms of the paddles 145 are usually set approximately 5 inches above ground level. For a comparatively short hay crop ranging in height from 12 to 18 inches and yielding roughly 1½ tons per acre, the bottoms of the paddles 145 are usually set approximately 3 inches above ground level. In lieu of swinging metallic paddles there may be substituted depending resilient or rubber paddles with their tops rigidly mounted.

The attachment 21 and its various rotatable components are suitably driven by a drive system powered by the engine 23 of the forage harvester 20. The source of power for the attachment 21 is from a power take-off shaft 160 (FIGS. 12, 13) which has its torque input end (not shown) suitably operatively connected to the engine 23 (FIG. 4). The shaft 160 has a toothed sprocket 161 detachably fixed thereto at one position therealong (FIG. 13) and shaft 160 has a terminal outer end portion operatively connected to a gearbox 158 which has an output shaft 159 arranged parallel to shaft 160. A sheave 162 is detachably fixed to the outer end portion of the output shaft 159. The sheave 162 is operatively connected by an endless power transmission belt means 163 (FIG. 12) to a sheave 164 which is fixed to the drive shaft 57 for the knife subassembly 40. An idler sheave 165 is included in a belt tensioning mechanism 166 to control the tension in the belt 163.

The top auger 90 is driven by a mechanical drive from the sprocket wheel 161 and such mechanical drive includes a quick-disconnect universal joint assembly 167. In particular, the top auger 90 is driven by a sprocket chain 170 (FIG. 13) which is operatively connected to the toothed sprocket 161 at one end and to a toothed sprocket 171 at its opposite end and the sprocket 171 is in turn fixed to a shaft 172 which extends horizontally across the attachment 21 and is rotatably supported by vertical frame members 173 and 174. A slip clutch 175 of standard construction is provided between the shaft 172 and the universal joint assembly 167 to protect the auger 90 and drive system in the event of jamming of the top auger.

The shaft 172 also has a toothed sprocket 177 fixed thereto at its outer end portion and the sprocket 177 also has a protective slip clutch 178. The sprocket 177 is connected by a sprocket chain 180 to a sprocket 181 which is fixed to a central shaft 182 which drives the front auger 36.

Figure 12:
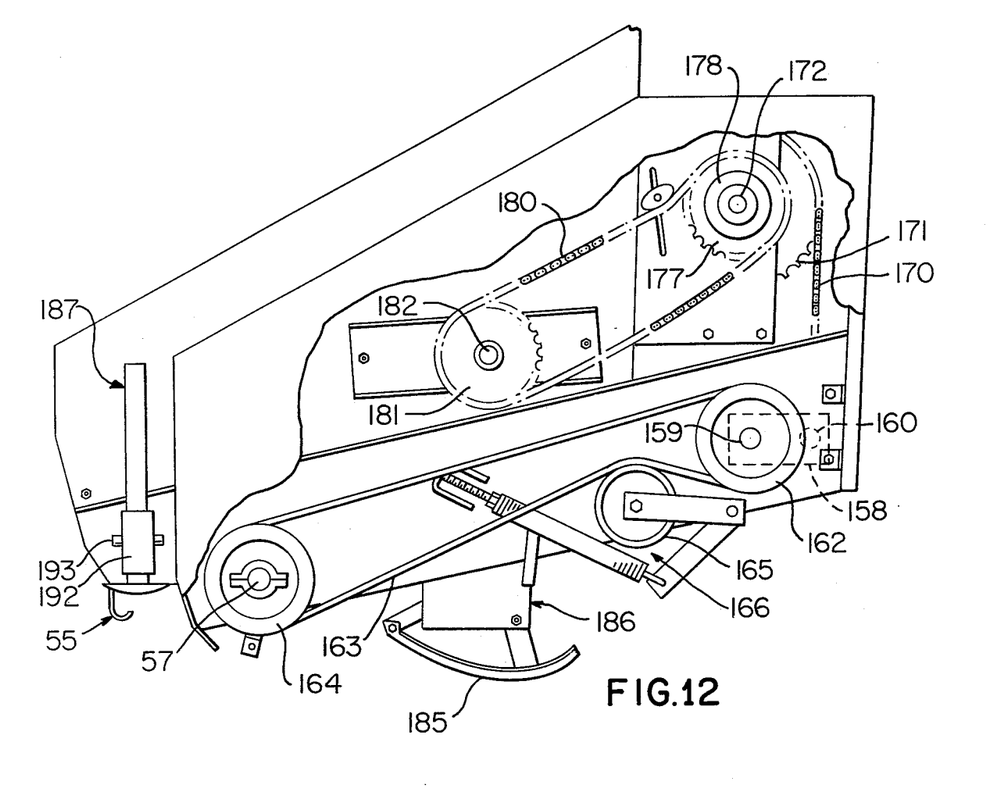
FIG. 12 is a side view of the attachment of FIG. 1 with parts in cross-section, parts in elevation, and parts broken away, the view particularly illustrating drive means for the driven components of such attachment.
Figure 13:
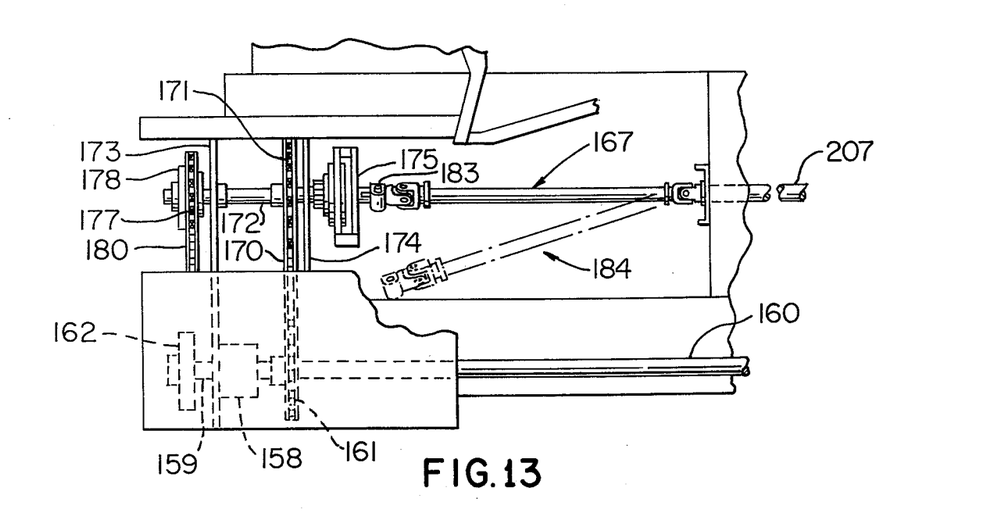
FIG. 13 is a fragmentary view particularly illustrating the main drive shaft from the engine of the FIG. 1 harvester and the means for driving the short auger in the attachment.

Thus, it is seen that the shaft 160 from the engine 23 of the forage harvester 20 provides the motive power to rotate the knife subassembly 40, front auger 36 and the top or rear auger 90 through the drive system linkage illustrated in FIGS. 12 and 13.

The mode of operation wherein cut and conditioned crop, such as hay, is moved from the crop transfer zone 35 to the ground G to define windrows or ground swaths will now be further described. For this mode of operation the quick-disconnect universal joint assembly 167 is disconnected from its solid line position (FIG. 13) by removing a fastener 183 therefor and the assembly is moved to the dotted line position 184. This renders the top auger 90 inoperative. The levers 131 and 136 are moved counterclockwise 90°, opening their respective doors 122 and 123. Likewise, the lever 112 is moved to the windrow position illustrated at 142 in FIG. 1 whereby the crank arm 111 of the mechanical linkage 100 is rotated to the position illustrated in FIG. 9. This movement of the crank arm 111 results in the mechanical linkage 100 folding the tines 97 against the auger 36 as such tines move into and through the crop transfer zone 35. With the tines 97 folded or retracted against the auger 36 in the manner described, the doors 122-123 open, the auger 36 gathering crop toward its central portion into the zone 35, and the disconnected top auger 90 serving as a barrier the cut and conditioned crop moves from the crop transfer zone 35 to the ground in a well-defined windrow for drying.

Once the windrows or ground swaths of crop have dried, the attachment 21 is used to pick up such ground swaths. For this operation the lever 112 is moved to its original position causing the tines 97 to extend and serve as rotary rakes as the crop is swept through the transfer zone 35, the doors 122-123 are closed, the universal joint assembly 167 is connected to set the top auger 90 in operation, and the damper 70 is adjusted by means 68 to assure smooth pickup and conveyance of crop to the chopper 26 without air pressure build-up. Once the top auger 90 is operating, its tines 97 are operated by mechanical linkage 100 in the manner previously described in detail, extending as the tines descend to sweep crop and folding as they ascend.

Figure 10:
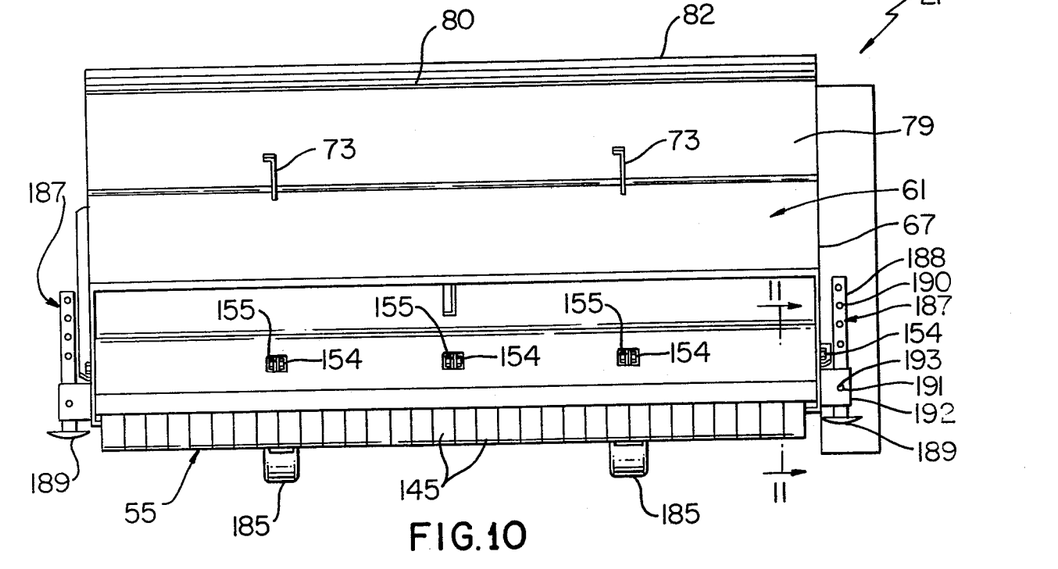
FIG. 10 is a front view of the attachment of this invention as separated from the forage harvester.

As best seen in FIGS. 4, 10 and 12, the attachment 21 has a pair of sled runners 185 which support the attachment 21 on the ground for pushing movement therealong by the forage harvester 20. Runners 185 are suitably attached to the frame structure of the attachment 21 by structure 186 (FIG. 12). Runners 185 may be replaced with wheels, rollers, or other suitable support devices.

The attachment 21 is also provided with a pair of adjustable supports 187 on opposite sides thereof as shown in FIG. 10. Each support 187 is comprised of a vertically telescoping member 188 which has a downwardly convex base plate 189 fixed to its lower end. The telescoping member 188 has a plurality of vertically spaced parallel openings 190 therein, each of which is adapted to be aligned with an opening 191 in a sleeve member 192 through which the member 188 telescopes. A suitable pin 193 is provided and inserted through a set of cooperating aligned openings 190 and 191 of a support 187 after lifting the attachment 21 and moving each member 188 to a desired position so that the weight at the forward end of the attachment is supported by the supports 187 when the attachment is not in use.

As will be readily apparent from FIG. 4 of the drawings, the multipurpose attachment 21 has a comparatively short axial or longitudinal length in the direction of harvesting movement, as indicated at 194, whereby an operator may maneuver the attachment 21 and forage harvester with optimum ease. In addition, the attachment 21 provides a cut of substantial width through a crop due to the predetermined width thereof which is preferably of the order of 12 feet. The attachment 21, having a short length as compared to the wheelbase of the harvester 20, is easily maneuvered and pushed at the front of such harvester without undue loads being imposed thereon.

The attachment 21 of this invention is preferably a push-type attachment or apparatus. In this connection it will be appreciated that reference to push-type refers to the fact that the attachment is pushed through a field to harvest an associated crop and is pushed ahead of the forage harvester 20 with the direction of harvesting movement being indicated generally by the arrow 195 in FIG. 4. This push-type arrangement for the attachment 21 results in an apparatus or attachment which can be more readily detachably installed on a power and drive unit of a forage harvester 20 making the attachment 21 more efficient and versatile while still providing a simple and economical apparatus.

However, it will be appreciated that it may be desired in some applications of this invention to employ attachment 21 with a towable forage harvester aft of the attachment, which forage harvester has a chopper, and wherein the attachment and towable forage harvester are towed by any suitable vehicle such as an ordinary tractor, for example.

The knife subassembly 40 and augers are suitably supported at opposite ends thereof on the attachment 21. As seen in FIGS. 2 and 6, the knife subassembly is supported at each end thereof by an associated bearing assembly 56. A support structure 198 for the bearing assembly 56 is also provided (FIG. 6). Shaft 57 and shaft 110 have a common geometrical axis. The sets of tines 96 are on the central sections of the augers. In each case the helical formations are on end sections of the augers. The hands or leads of the helical formations on the auger left ends are opposed to the hands or leads of the formations on the right side.

The auger 36 has a pair of opposed support structures 200 at opposite ends thereof (FIG. 3) and the structures 200 may have suitable bearings associated therewith for carrying the central shaft portion 110 of the auger 36. Auger 36 may be vertically variably positioned by an adjustment mechanism 201 and, accordingly, an elongated opening 203 is provided through each vertical side wall of the attachment 21 to allow displacement of the central shaft of the auger 36. The mechanism 201 angularly positions the structures 200 at opposite ends of auger 36 about pivot pins 204 to control the height of the crop transfer zone 35 and the spacing between the elements of the long auger 36 and the sheet metal trough 126 therebeneath.

The comparatively short auger 90 is also supported by support structure 205 in a substantially cantilevered manner from an associated pivot shaft 206 (FIG. 3). The auger 90 is driven by its central shaft 207 through the universal joint assembly 167 (FIG. 13). The support structure 205 operates so that it allows floating movements of the auger 90 upwardly and downwardly about the shaft 206. Suitably spring means (not shown) may be provided in cooperation with gravity resiliently to hold the auger 90 at the lowest position so that as the volume of crop moved by such auger increases it is free to float upwardly.

The mounting structure in attachment 21 comprises the housing 52, the bearing assembly 56, the supports 200 with associated bearings, the pivot shaft 206, and support 205.

The attachment 21 has means for detachably fastening the rear portion thereof to the forage harvester 20 and such means is indicated generally at 210 (FIG. 3) and comprises four mounting yokes 211 arranged two on each side of a conveyor 212 (FIG. 4) of the conveying means 25 of attachment 21. Each yoke 211 fits over an associated pin 213 which is fixed on the conveyor 212. A pair of T-bolts 214 are provided on opposite sides of the conveyor 212; and each T-bolt 214 has a cross-arm portion which is adapted to be hooked within an associated J-shaped bracket 215 which is fixed on its side of the attachment 21. The attachment 21 is installed and held in position by positioning the mounting yokes 211 over the pins 213, fastening the T-bolts 214 within their J-shaped brackets 215, and threading nuts provided on the leg portions of the T-bolts tightly in position. The attachment is removed by following a reverse procedure.

Reference has been made in this disclosure to the knife subassembly 40 having a predetermined width and to the overall attachment 21 and other components thereof as having predetermined width, and it is to be understood that this reference to width refers to the interior dimension across the attachment 21 perpendicular to the direction 195 of harvesting movement.

It will also be appreciated that various terms used in this specification including, for example, forward, rear, top, bottom, upper, lower, and like terms, as well as other forms of such terms, have been used in this disclosure to describe the various positions of components of the attachment and forage harvester as they are viewed in the drawings and for ease of presentation. However, it is to be understood that such terms are not to be considered as limiting the scope of this invention.

While an exemplary embodiment of this invention and methods of practicing the same have been illustrated and described, it will be recognized that this invention may be otherwise variously embodied and practiced within the scope of the following claims.

We claim:

1. In combination, a mobile agricultural machine adapted to traverse ground for cutting, conditioning and moving a crop to a crop transfer zone within said machine and then directly away from said zone, and a chopper adapted to trail said machine, said machine having:
    flail means for cutting and conditioning standing crop in one mode of operation and for picking up a pre-cut ground swath of a crop in another mode of operation,
    said machine having means for gathering crop and moving crop from the flail means to the transfer zone, and
    said machine having means for selectively moving crop directly from said transfer zone toward said chopper and toward the ground.

2. A mobile agricultural machine adapted to traverse ground for cutting, conditioning and moving a crop to a crop transfer zone within said machine and then in a selected one of two directions directly from said zone, one of said directions being away from, and the other of said directions being toward, the ground, said machine comprising, in combination:
    a mounting structure, flail means rotatably mounted at the front of said structure for cutting and conditioning standing crop and for picking up a pre-cut ground swath,
    means comprising an auger rotatably mounted on said structure aft of said flail means and having opposed formations for gathering crop and moving crop rearwardly from the flail means to the transfer zone, said transfer zone being beneath said auger, and
    a system for selectively moving crop directly from said transfer zone in said directions,
    said system comprising sweeping means on said auger selectively active to sweep crop rearwardly through said zone or inactive to permit crop to flow to the ground,
    a closure for the transfer zone, said closure being selectively positioned to confine crop flow to the rear or to permit crop flow to the ground, and a crop-removal device mounted on said structure aft of said auger and selectively rotating to move crop rearwardly out of said zone or stationary to block crop flow to the rear.

3. A mobile agricultural machine adapted to traverse ground for cutting, conditioning and moving a crop to a crop transfer zone within said machine and then in a selected one of two directions directly from said zone, one of said directions being away from, and the other of said directions being toward, the ground said machine comprising in combination:
a mounting structure, flail means rotatably mounted at the front of said structure for cutting and conditioning standing crop and for picking up a pre-cut ground swath of a crop,
means comprising an auger rotatably mounted on said structure aft of said flail means and having opposed formations for gathering crop and moving crop rearwardly and centrally of the machine from the flail means to the transfer zone, and said transfer zone being beneath said auger, and
means including a closure and a rotating element mounted on said structure for selectively moving crop directly from said transfer zone in said directions.

4. A mobile agricultural machine adapted to traverse ground for cutting, conditioning and moving a crop to a crop transfer zone within said machine and then in a selected one of two directions directly from said zone, one of said directions being away from, and the other of said directions being toward, the ground, said machine comprising:
a housing structure,
flail means/for cutting and conditioning standing crop in one mode of operation and for picking up a pre-cut ground swath of a crop in another mode of operation,
means for compressing and gathering crop and moving crop rearwardly from the flail means to the transfer zone, and
means/for selectively moving crop directly from said transfer zone in said directions,
said flail means, compressing and gathering and moving means, and selective moving means being supported by and disposed within said housing structure.

5. A mobile agricultural machine adapted to traverse ground for cutting, conditioning and moving a crop to a crop transfer zone within said machine and then in a selected one of two directions directly from said zone, one of said directions being away from, and the other of said directions being toward, the ground, said machine comprising in combination:
flail means/for cutting and conditioning standing crop in one mode of operation and for picking up a pre-cut ground swath of a crop in another mode of operation,
means comprising an auger extending across said machine for gathering crop and moving crop from the flail means to the transfer zone, said transfer zone being disposed under said auger,
means/for selectively moving crop directly from said transfer zone in said directions, and
a housing provided on said machine and housing the flail means, the gathering and moving means, and the selective moving means.

6. A mobile agricultural machine in accordance with claim 5 in which the means for selectively moving crop comprises:
a second auger extending laterally in the machine, and
door means in said housing beneath said transfer zone,
said second auger being operable with said door means being closed in order to move the crop away from the ground,
said door means being open and said second auger being stationary to function as a barrier when crop is being moved through the door means toward the ground.

7. A mobile agricultural machine in accordance with claim 6 in which the first auger is formed with two end sections and a central section and axially inwardly conveying helical formations of opposite senses on said end sections, said central section being over said transfer zone.

8. A mobile agricultural machine in accordance with claim 7 in which the second auger is formed with two end sections and a central section having axially inwardly conveying helical formations of opposite senses on said end sections which compress crop toward said central section.

9. A mobile agricultural machine adapted to traverse ground for cutting, conditioning and moving a crop to a crop transfer zone within said machine and then in a selected one of two directions directly from said zone, one of said directions being away from, and the other of said directions being toward, the ground, said machine comprising in combination:
flail means for cutting and conditioning standing crop in a first mode of operation and for picking up a pre-cut ground swath of a crop in a second mode of operation,
a first laterally extending auger having a central section and two end sections, said first auger being rotatably mounted upwardly and rearwardly of said flail means, said first auger having opposed-hand helical formations on its end sections for compressing crop departing from said flail means, said first auger further having tines mounted on its central section for moving the compressed crop into a transfer zone located generally beneath said first auger,
means for selectively moving crop from said transfer zone in said directions,
the last-mentioned means comprising:
a second laterally extending auger, having a central section and end sections, rotatably mounted upwardly and rearwardly of said first auger, said second auger having opposed helical formations on its end sections for further compressing crop passing through and departing from said transfer zone, said second auger also having tines mounted on its central section for moving crop away from the ground, and
means beneath said transfer zone for discharging crop in said zone toward ground,
means for disabling the second auger so that it forms a deflecting barrier to crop directed toward ground, and
a housing formed to permit discharge of the crop directed away from ground, said housing having a frontal air vent therein for venting air introduced into said machine.

10. An attachment for a forage harvester having the multiple purpose of cutting, conditioning and selectively moving a crop in two directions directly from a crop transfer zone thereof wherein one of said directions is toward the ground and the other of said directions is away from the ground, said attachment comprising in combination:

a mounting structure, a flail device of predetermined width rotatably mounted at the front of said structure for cutting and conditioning a corresponding width of a standing crop and for picking up a pre-cut ground swath of crop and moving said ground swath to said transfer zone, means comprising an auger rotatably mounted on said structure aft of said flail device and having opposed formations for gathering crop from said flail device into said transfer zone to define a dense swath which has a width less than said predetermined width, said transfer zone being beneath said auger, and means including a closure and a rotating element mounted on said structure for selectively moving crop directly from said transfer zone in said two directions.

11. An attachment as set forth in claim 10 in which said auger has a central section and in which the said opposed formations are axially inwardly conveying helical gathering elements of opposite sense on opposite ends of the auger for conveying crop axially and rearwardly.

12. An attachment as set forth in claim 10 in which said rotatable element in said means for selectively moving comprises a second auger, rotatably mounted on said mounting structure aft of the first-mentioned auger, said attachment further including a closure beneath the first-named auger, said second auger being stationary when said closure is open so that crop flows out of said crop transfer zone toward ground, and said second auger rotating when said door means is closed to move crop rearwardly.

13. In combination with a vehicle including a chopper, a push-type mobile multi-purpose crop harvesting attachment for cutting, conditioning and selectively moving a crop in two basic directions directly from an internal crop transfer zone wherein one of said directions is toward the ground and the other of said directions is away from the ground, said attachment comprising in combination:

a mounting structure, a flail device of predetermined width and rotatably mounted at the front of said structure for cutting and conditioning a corresponding width of a standing crop and for picking up a pre-cut ground swath of crop and moving said crop to said transfer zone, means comprising an auger rotatably mounted on said structure aft of said flail device and having opposed formations for gathering from the flail device into said transfer zone crop formed as a dense swath which has a width less than said predetermined width, said transfer zone being beneath said auger, means including a closure and a rotating element mounted on said structure for selectively moving crop directly from said transfer zone into said chopper and toward the ground, and means for detachably fastening the mounting structure to said vehicle.

14. A mobile agricultural machine adapted to traverse ground for cutting, conditioning and moving a crop to a crop transfer zone within said machine and then in a selected one of two directions directly from said zone, one of said directions being away from, and the other of said directions being toward, the ground, said machine comprising in combination:

flail means for cutting and conditioning standing crop in one mode of operation and for picking up a pre-cut ground swath of a crop in another mode of operation, means for gathering crop and moving crop from the flail means to the transfer zone, and means for selectively moving crop directly from said transfer zone in said directions, said gathering and moving means comprising a rotatably mounted time support, a plurality of tines mounted on said support, and augularly adjustable means for folding said tines against the tine support through a selected part of its working arc and extending said tines away from said tine support through another part of its working arc, said tines being extended to sweep crop through said zone when the selected direction is away from ground and said tines being folded so as not to interfere with the discharge of the crop material when the selected direction is toward ground.

15. The combination in accordance with claim 14 in which said rotatably mounted tine support is an auger having a central section on which the tines are mounted and also two end sections helically formed in opposite senses to compress crop material.

16. The combination in accordance with claim 15 in which the means for selectively moving crop from the transfer zone comprises a second rotatably mounted tine support and a discharge means which is open when the selected direction is away from the ground and closed when the selected direction is away from the ground, said second rotatably mounted tine support functioning as a crop barrier when the selected direction is toward the ground.

17. The combination in accordance with claim 16 in which the second tine support is a second auger having a central section on which the tines are mounted and two end sections helically formed in opposite senses to compress crop.

18. A mobile agricultural machine adapted to traverse ground for cutting, conditioning and moving a crop to a crop transfer zone within said machine and then in a selected one of two directions directly from said zone, one of said directions being away from, and the other of said directions being toward, the ground, said machine comprising in combination:

flail means for cutting and conditioning standing crop in one mode of operation and for picking up a pre-cut ground swath of a crop in another mode of operation, means for gathering crop and moving crop rearwardly from the flail means to the transfer zone, means for selectively moving crop directly from said transfer zone in said directions, and a housing structure supporting and housing the flail means, the gathering and moving means, and the selective moving means, said housing having an air vent therein in a region of said housing disposed between the flail device and the crop gathering and moving means, said vent serving to vent air introduced into said housing by said flail means.

19. The machine in accordance with claim 18 in which said vent extends generally in the direction of travel of said machine.

20. The machine in accordance with claim 19 in which said vent extends completely across said housing.

21. A machine in accordance with claim 20 in which said housing has an outer inclined top frontal wall and an inner similarly inclined wall spaced from the top frontal wall, said walls forming the vent.

22. A mobile agricultural machine adapted to traverse ground for cutting, conditioning and moving a crop to a crop transfer zone within said machine and then in a selected one of two directions directly from said zone, one of said directions being away from, and the other of said directions being toward, the ground, said machine comprising in combination:
   flail means for cutting and conditioning standing crop in one mode of operation and for picking up a pre-cut ground swath of a crop in another mode of operation,
   means for gathering crop and moving crop rearwardly from the flail means to the transfer zone, and
   means for selectively moving crop directly from said transfer zone in said directions,
   the means for gathering and moving crop comprising a rotatably mounted time support,
   a housing for the flail means, the gathering and moving means, and the selective moving means, said housing having an air vent therein in a region of said housing disposed between the flail means and the crop gathering and moving means, and
   damping means for adjusting the effective area of said vent.

23. A push-type mobile agricultural machine adapted to traverse ground for cutting, conditioning and moving a crop to a crop transfer zone within said machine and then in a selected one of two directions directly from said zone, one of said directions being away from, and the other of said directions being toward, the ground, said machine comprising in combination:
   a mounting structure,
   flail means rotatably mounted at the front of said structure for cutting and conditioning standing crop and for picking up a pre-cut ground swath of a crop,
   means comprising an auger rotatably mounted on said structure aft of said flail means and having opposed formations for gathering crop and moving crop rearwardly from the flail means to the transfer zone,
   a system including a closure and a rotating element mounted on said structure for selectively moving crop directly from said transfer zone in said directions, and
   a deflector mounted frontally of said machine for bending forwardly stems of crop being harvested, said deflector also serving as an impact absorber for hard objects thrown forwardly by said flail means.

* * * * *